US007021543B2

(12) United States Patent
Aoyama et al.

(10) Patent No.: US 7,021,543 B2
(45) Date of Patent: Apr. 4, 2006

(54) IMAGE READER USING OFF-AXIAL OPTICAL SYSTEM FOR IMAGING OPTICAL SYSTEM

(75) Inventors: Takeshi Aoyama, Tokyo (JP); Hyoe Iwata, Tokyo (JP); Yukihiro Miura, Tokyo (JP); Takehiro Kishi, Tokyo (JP); Takayuki Suga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 10/835,893

(22) Filed: Apr. 29, 2004

(65) Prior Publication Data

US 2004/0223205 A1 Nov. 11, 2004

(30) Foreign Application Priority Data

May 7, 2003 (JP) ............................ 2003-129053
Apr. 27, 2004 (JP) ............................ 2004-131573

(51) Int. Cl.
*G06K 7/10* (2006.01)

(52) U.S. Cl. ................................ 235/454; 235/462.36

(58) Field of Classification Search ............... 235/454, 235/462.36

See application file for complete search history.

(56) References Cited

U.S. PATENT DOCUMENTS 4,536,077 A * 8/1985 Stoffel ........................ 358/497
5,001,566 A * 3/1991 Coli et al. .................. 358/451
5,341,225 A * 8/1994 Stein et al. ................. 358/498
5,583,662 A * 12/1996 Takahashi et al. .......... 358/474
5,585,937 A * 12/1996 Kokubo et al. ............. 358/451
5,589,953 A * 12/1996 Tazawa et al. .............. 358/498
5,610,720 A * 3/1997 Fujioka et al. .............. 358/296
RE36,503 E * 1/2000 Rubley et al. .............. 358/474
6,021,004 A 2/2000 Sekita et al.
6,137,615 A * 10/2000 Tseng ......................... 359/196
6,147,343 A * 11/2000 Christensen ................ 358/497
6,166,866 A 12/2000 Kimura et al.
6,169,622 B1 * 1/2001 Tsai et al. ................... 359/210

(Continued)

FOREIGN PATENT DOCUMENTS

EP 1239655 A2 * 9/2002
JP 59171361 A * 9/1984

(Continued)

*Primary Examiner*—Uyen-Chau N. Le
(74) *Attorney, Agent, or Firm*—Canon U.S.A. Inc. I.P. Div.

(57) ABSTRACT

An image reader adopting an off-axial optical system, an adjustable imaging mirror and a CCD fixed to a highly rigid structure. Since the relative position between reflecting and imaging mirrors can be set highly accurately, adjusting only the CCD-mounting position allows a required specification of the read image to be met. The imaging mirror can easily be adjusted without distorting the reflecting surface. The reflecting and imaging mirrors, and the CCD-mounting-position adjuster are positioned directly to reflecting-mirror supporting sections, imaging-mirror supporting sections, and CCD supporting sections, which are integrated with a carriage casing, and fixed to them. The CCD is fixed to the carriage casing with the CCD-mounting-position adjuster. An imaging mirror close to a diaphragm and adjacent to the image is supported by a mirror adjusting plate, which can be displaced to adjust the position of the imaging mirror.

12 Claims, 4 Drawing Sheets

U.S. PATENT DOCUMENTS

| | | | | |
|---|---|---|---|---|
| 6,324,012 | B1 * | 11/2001 | Aratani et al. | 359/627 |
| 6,445,469 | B1 * | 9/2002 | Horiuchi et al. | 358/406 |
| 6,515,774 | B1 * | 2/2003 | Horiuchi et al. | 358/474 |
| 6,894,263 | B1 * | 5/2005 | Fujibayashi et al. | 358/482 |
| 2001/0043372 | A1 * | 11/2001 | Suzuki et al. | 358/474 |
| 2003/0038228 | A1 | 2/2003 | Fujibayashi | |
| 2003/0043351 | A1 * | 3/2003 | Ochi et al. | 355/18 |

FOREIGN PATENT DOCUMENTS

| | | | | |
|---|---|---|---|---|
| JP | 60182861 | A | * | 9/1985 |
| JP | 3-113961 | A | | 5/1991 |
| JP | 2000098476 | A | * | 4/2000 |
| JP | 2003344956 | A | * | 12/2003 |
| JP | 2004133197 | A | * | 4/2004 |

* cited by examiner

IMAGE READER USING OFF-AXIAL OPTICAL SYSTEM FOR IMAGING OPTICAL SYSTEM

BACKGROUND OF THE INVENTION

1. Field of the Invention

The present invention relates to an imaging means for reading a document and an image reader using the same.

2. Description of the Related Art

Image scanners serving as image readers for reading image information on document surfaces have been disclosed in, for example, Japanese Patent Laid-Open No. 3-113961.

Such image scanners read image information by exposure-scanning the document surface, which involves moving only a reflecting mirror while an imaging lens and a line sensor are fixed.

In order to simplify the device structure, a carriage-integrated scanning system has been employed which scans a document surface with an imaging lens, line sensor and so on, which are integrated together.

FIG. 3 shows an image reader of a conventional carriage-integrated scanning system. Light flux, emitted from a light source 501, illuminates a document 503 placed on a document glass plate 502. The light flux reflecting off the document 503 passes through first, second, and third mirrors 504, 505, and 506 in order, such that the optical path is bent in a carriage 511. The light flux then passes through an imaging lens 509 to form an image on a line sensor 510. A drive motor (not shown) moves the carriage 511 in the direction of arrow A (in the subscanning direction) to thereby read the image information on the document 503. The imaging lens 509 is fixed to a lens barrel 512. The first, second, and third mirrors 504, 505, and 506 and the lens barrel 512 are fixed to the carriage 511.

It is important for image readers of digital copying machines to have high resolution and high speed. Increasing the optical path length can improve resolution of imaging lenses, but light intensity decreases because of a decreased angle of view. Further, making the imaging lens lighter, however, decreases resolution because of an increased angle of view. As such, it was therefore difficult to adopt the carriage-integrated scanning system.

Accordingly, an image reader of a carriage-integrated scanning system is disclosed in Japanese Patent Laid-Open No. 2002-335375 which adopts a decentered optical system (off-axial optical system) that forms an image by the reflection of light flux, as disclosed in Japanese Patent Laid-Open No. 8-292371. An off-axial optical system is defined as an optical system including a curved surface (off-axial curved surface) in which when the axis along a light beam passing through the center of an image and the center of the pupil is the reference axis, the plane normal at the intersection point of the constituent surface with the reference axis is not on the reference axis. The reference also discloses a structure in which air is used as the medium between the reflecting surfaces of the off-axial optical system to prevent the occurrence of chromatic aberration, particularly when color documents are read.

The above-mentioned references, however, do not disclose fixing means and adjusting means for the reflecting mirrors, the imaging mirrors having the off-axial reflecting surfaces, and the line sensors in the off-axial optical system adopted to the image readers of the carriage-integrated scanning system.

Image readers of digital copying machines can generally read documents having sizes from about A4 to A3. Thus, the off-axial reflecting surfaces need to be on the order of 30 mm each side. The off-axial reflecting surfaces are also required to have extremely accurate free-form surfaces. The working of the reflecting surfaces therefore requires several times of reflecting-surface measurements and correction processings. However, in the above references, the plurality of reflecting surfaces constructing the off-axial optical system is formed on one integrated optical element. Accordingly, in working the reflecting surfaces, when one reflecting surface is corrected, the free-form surfaces of the other reflecting surfaces are deflected, making it extremely difficult to finish all the surfaces as large as about 30 mm and with required accuracy. Furthermore, a hollow integrated block that uses air for the medium between the off-axial reflecting surfaces in order to reduce the chromatic aberration in reading color documents has a shape that is difficult to process. In other words, in the case of working the off-axial optical element by cutting, it is difficult for a cutting tool to reach the surface to be cut, and for die molding, it is difficult to separate the die from a molded optical element.

SUMMARY OF THE INVENTION

The present invention is directed to an image reader for reading a document. The image reader includes an illuminator for illuminating light onto the document, a line sensor, and a plurality of imaging mirrors for refracting the light reflecting off the document onto the line sensor.

In one aspect of the present invention, each of the plurality of imaging mirrors have off-axial reflecting surfaces. The off-axial reflecting surfaces have a curvature so that the optical path of incident light is different from the optical path of emerging light.

In another aspect of the present invention, the image reader includes a moveable casing which directly supports the light source, the plurality of imaging mirrors and the line sensor. A driving section moves the casing relative to the document, and therefore moves the light source, the plurality of imaging mirrors and the line sensor.

In yet another aspect of the present invention, the image reader includes the plurality of imaging mirrors including an adjustable imaging mirror and includes a mirror adjusting mechanism. In one embodiment, the mirror adjusting mechanism includes plates that support the adjustable imaging mirror, a base, an adjusting member disposed between the plates and the base to define a spacing between the base and the plates, and a pushing member pushing the plates into pressure contact with the adjusting member. By adjusting the adjusting member, the spacing is adjusted to adjust the orientation of the adjustable imaging mirror. In another embodiment, the base includes a protrusion, wherein the plates are in pressure contact with the protrusion and the adjusting member.

In another embodiment, the image reader includes a diaphragm in the optical path of the plurality imaging mirrors, wherein an imaging mirror adjacent to the diaphragm is set as the adjustable imaging mirror.

Further features and advantages of the present invention will become apparent from the following description of the embodiments (with reference to the attached drawings).

DESCRIPTION OF THE PREFERRED EMBODIMENTS

Figure 1A:
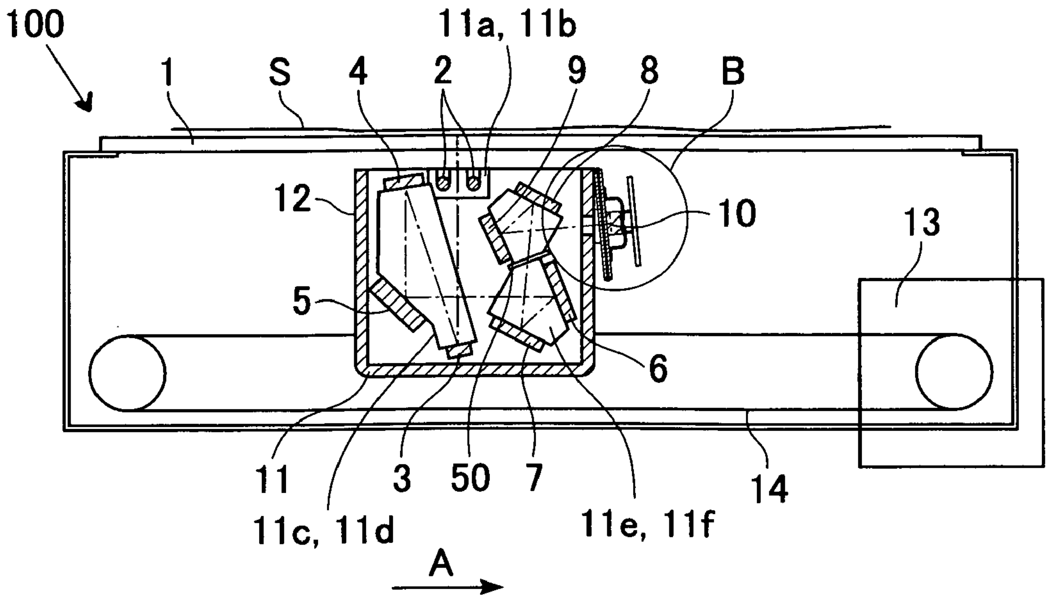
FIG. 1A is a sectional view of an image reader according to one embodiment of the present invention.
Figure 1B:
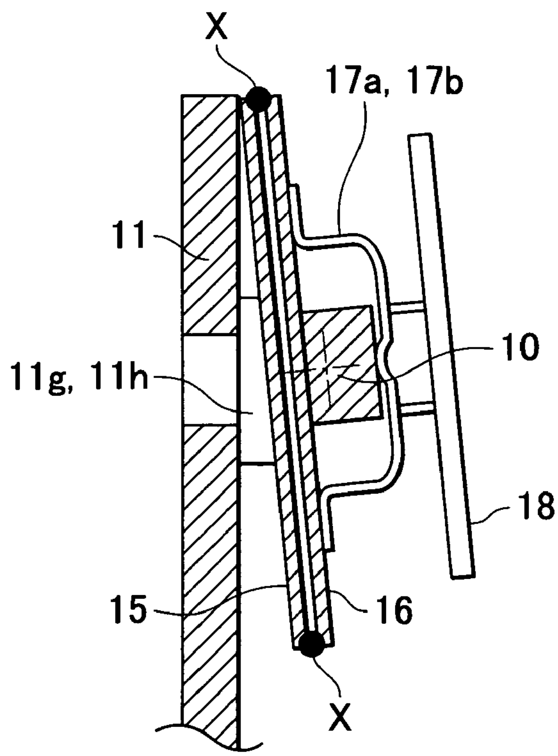
FIG. 1B is an enlarged view of a portion of the image reader defined by the circle B shown in FIG. 1A.
Figure 2:
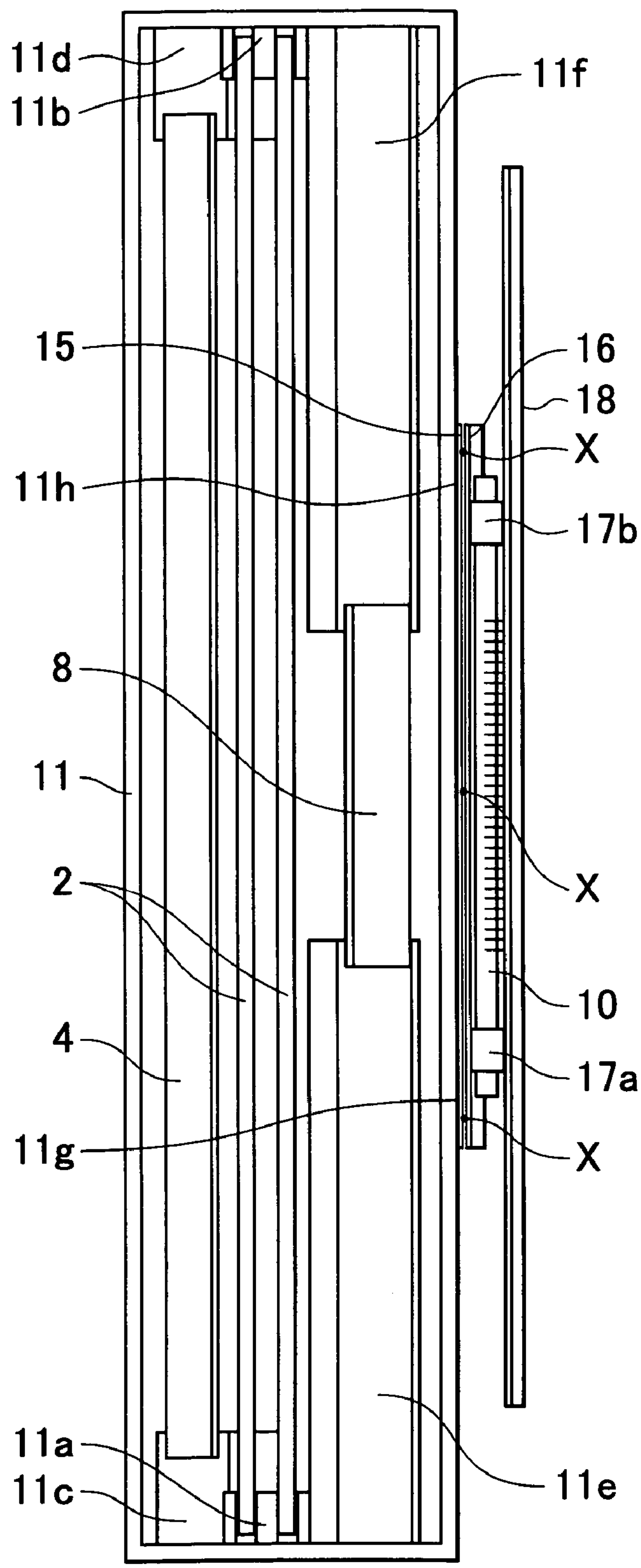
FIG. 2 is a top view of a carriage of the image reader of FIG. 1.
Figure 3:
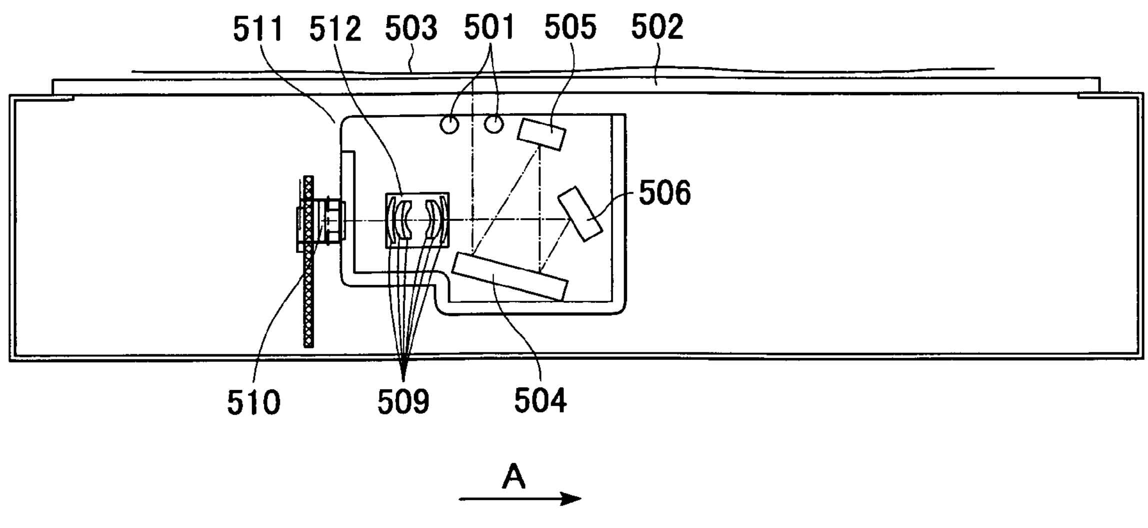
FIG. 3 is a schematic view of a conventional image reader.

FIG. 1A is a sectional view of an image reader 100 according to one embodiment of the present invention. The image reader 100 can be incorporated in an image scanner or a copying machine. FIG. 1B is an enlarged view of a portion of the image reader 100 defined by circle B shown in FIG. 1A. FIG. 1B shows details of a CCD (line sensor) 10. FIG. 2 is a top view of a carriage 12 of the image reader 100 shown in FIG. 1.

A document S is placed on a document glass plate 1. A light source 2 serving as an illuminator can be, for example, a xenon lamp. First, second, and third reflecting mirrors 3, 4, and 5 refract the optical path of light flux coming from the document S. Each of first, second, third and fourth imaging mirrors 6–9 has an off-axial reflecting surface, which refracts the light flux using air as medium to form an image on the line sensor 10. The imaging mirrors 6–9 can be formed from resin such as polycarbonate. A diaphragm 50 is provided in the optical path between the second imaging mirror 7 and the third imaging mirror 8 to reduce the light flux. A package of the linear image sensor (It is shown later as CCD.) 10 serving as reading means is constructed of a plurality of light-receiving elements arranged linearly (in the main scanning direction).

A carriage 12 accommodates the light source 2, the reflecting mirrors 3–5, the imaging mirrors 6–9, and the CCD 10. The carriage 12 includes a casing 11 having lamp supporting sections 11*a* and 11*b*, reflecting-mirror supporting sections 11*c* and 11*d*, and imaging-mirror supporting sections 11*e* and 11*f* integrated therewith. The lamp supporting sections 11*a* and 11*b* support opposing ends of the lamp 2, the reflecting-mirror supporting sections 11*c* and 11*d* support opposing ends of the reflecting mirrors 3–5, and the imaging-mirror supporting sections 11*e* and 11*f* support opposing ends of the imaging mirrors 6–9, with each supporting sections set supporting the supported members in the main scanning direction. The light source 2 is fixed to the lamp supporting sections 11*a* and 11*b*, the first to third reflecting mirrors 3 to 5 is fixed to the reflecting-mirror supporting sections 11*c* and 11*d*, and the first to fourth imaging mirrors 6–9 is fixed to the reflecting-mirror supporting sections 11*e* and 11*f*, respectively, with an adhesive. A CCD mount 15 is fixed directly to CCD support sections 11*g* and 11*h*, which are integrated with the casing 11. The CCD 10 is fixed to a CCD table 16 with leaf springs 17*a* and 17*b*. The CCD mount 15 and the CCD table 16 are fixed together by soldering (X), with the CCD 10 adjusted so that the read quality (the focus, geometrical characteristics, etc.) of the image information read by the CCD 10 has specified specifications. A drive motor 13 drives a drive belt 14 connected to the casing 11 to move the carriage 12 in the direction of arrow A.

In this embodiment, the light flux emitting from the light source 2 illuminates the document S. The light flux reflecting off the document S is refracted by the first to third reflecting mirrors 3–5, then further refracted by the first to fourth imaging mirrors 6–9, and imaged on the CCD 10. The carriage 12 is moved in the direction of the arrow A (in the subscanning direction) by the drive motor 13; thus, the image information of the document S is read.

In this embodiment, the reflecting-mirror supporting sections 11*c* and 11*d* and the imaging-mirror supporting sections 11*e* and 11*f* are integrated with the casing 11. Alternatively, the reflecting-mirror supporting section 11*c* and the imaging-mirror supporting section 11*e* can be integrally formed with a first casing, the reflecting-mirror supporting section 11*d* and the imaging-mirror supporting section 11*f* can be integrally formed with a second casing, and the first casing and the second casing can be joined together with a stay or the like and, thereby, forming a large casing having exactly the same advantages as those of this embodiment in which the relative positions between all the reflecting mirrors and imaging mirrors are ensured. In the present embodiment, the CCD mount 15 and the CCD table 16 are fixed together with solder (X). Alternatively, they may be fixed together with ultraviolet setting resin, an adhesive or the like. The CCD mount 15 may be alternatively integrated with the casing 11.

Figure 4A:
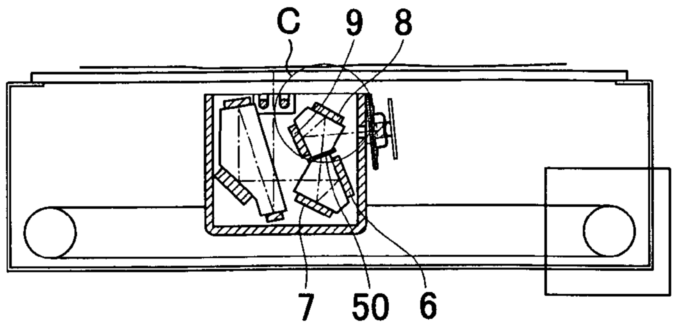
FIG. 4A is a sectional view of the image reader shown in FIG. 1A.
Figure 4B:
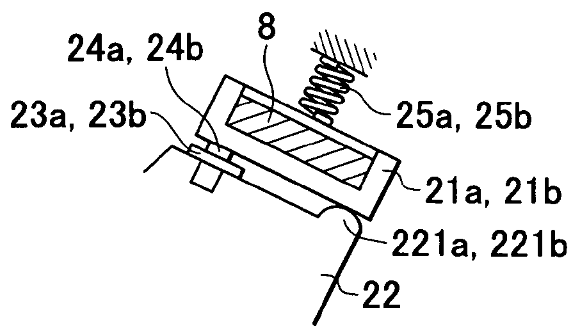
FIG. 4B is an enlarged view of a mirror adjusting member as defined by the circle C shown in FIG. 4A.
Figure 4C:
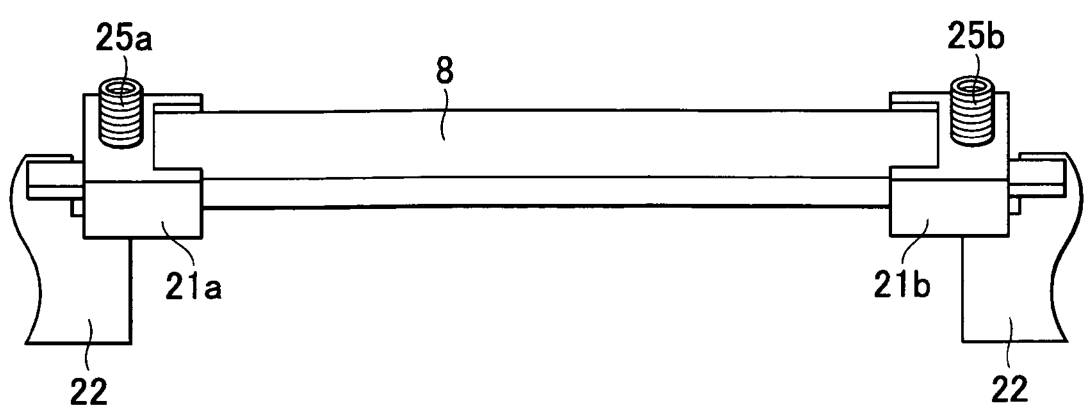
FIG. 4C is a perspective view of the mirror adjusting mirror shown in FIGS. 4A and 4B.

FIGS. 4A to 4C show an imaging-mirror adjusting mechanism. FIG. 4B is an enlarged view defined by circle C shown in FIG. 4A, and FIG. 4C is a perspective side view of the imaging-mirror adjusting mechanism. In this embodiment, the third imaging mirror 8 is fixed to mirror adjusting plates 21*a* and 21*b*. A change in position of the imaging mirrors can influence optical characteristics of imaging, such as displacement, distortion, and focus. The third imaging mirror 8 is positioned near the diaphragm 50 and adjacent to the image (adjacent to the CCD 10) with respect to the diaphragm 50. Accordingly, among the imaging mirrors 6 to 9, the third imaging mirror 8 has the most influence on optical characteristics. When set screws 24*a* and 24*b* are inserted into threaded holes of screw plates 23*a* and 23*b*, which are fixed to a casing 22, and turned, the set screws 24*a* and 24*b* can recede from the screw plates 23*a* and 23*b*. Springs 25*a* and 25*b* push the mirror adjusting plates 21*a* and 21*b* to bring them into pressure contact with protrusions 221*a* and 221*b* of the casing 22 and the set screws 24*a* and 24*b*. By rotating the set screws 24*a* and 24*b*, the position and orientation of the third imaging mirror 8 can be adjusted to an optimum position. In the off-axial optical system where light flux is controlled with a diaphragm, the closer the imaging mirror is to the diaphragm, the more influence the mirror has on the optical characteristics with respect to the displacement. In this embodiment, since the displacement of the third imaging mirror 8 adjacent to the image has a greater influence on the optical characteristics of the image than the second imaging mirror 7 adjacent to the object, the third imaging mirror 8 is configured adjustable. Also adjustment of an imaging mirror adjacent to the object with respect to the diaphragm on the optical axis is made easier than one apart from the diaphragm.

In this embodiment, since the load of the springs 25*a* and 25*b* is not applied directly to the third imaging mirror 8, the reflecting surface of the third imaging mirror 8 is not distorted by the load of the springs 25*a* and 25*b* even when the third imaging mirror 8 is made of resin such as polycarbonate, therefore providing high-quality optical characteristics. Since the embodiment is constructed such that the most sensitive third imaging mirror 8 is adjustable, the range of adjustment can be increased, thus facilitating the adjustment.

In this embodiment, while the mirror adjusting plate is divided into the mirror adjusting plates 21*a* and 21*b*, a one-piece adjusting plate can offer similar advantages.

In the off-axial optical system, the optical characteristics vary depending on the positional accuracy of the off-axial reflecting surface to the optical axis. Accordingly, providing the third imaging mirror 8 adjustable in the direction parallel to the reflecting surface (not shown) allows high-accuracy supporting, thus providing more accurate optical characteristics. This can be achieved by an adjusting structure similar to that of the screw plates 23*a* and 23*b* and the set screws 24*a* and 24*b*, shown in FIGS. 4A–C, for the mirror adjusting plates 21*a* and 21*b* in the direction of the reflecting surface of the third imaging mirror 8. It may be applicable of the structure that the imaging mirrors 7 and 8 adjacent to the diaphragm conduct angle adjustment and position adjustment in a rectangular direction of the optical axis.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reader for reading a document, the image reader comprising:
- an illuminator illuminating light onto the document;
- a line sensor; and
- a plurality of imaging mirrors, including an adjustable imaging mirror, refracting light reflected off the document onto the line sensor; and
- a mirror adjusting mechanism operatively coupled to the adjustable imaging mirror to adjust an orientation of the adjustable imaging mirror, wherein the mirror adjusting mechanism includes:
  - a support structure supporting the adjustable imaging mirror;
  - a base;
  - an adjusting member positioned in contact between the base and the support structure so as to define a spacing between the base and the support structure so that the support structure has a position relative to the base;
  - a pushing member pushing the support structure into pressure contact with the adjusting member, and
  - wherein adjusting the adjusting member changes the spacing between the support structure and the base so as to change the position of the support structure, and therefore change the orientation of the adjustable imaging mirror.

2. An image reader according to claim 1, wherein each of the plurality of imaging mirrors includes an off-axial reflecting surface.

3. An image render according to claim 1, further comprising a diaphragm, wherein the adjustable imaging minor is located closest to the diaphragm than the other plurality of imaging mirrors.

4. An image reader according to claim 1, further comprising a moveable casing supporting the illuminator, the line sensor, and the plurality of imaging mirrors.

5. An image reader according to claim 1, wherein the line sensor is adjustably fixed to a moveable casing.

6. An image render according to claim 5, further comprising a first member supporting the line sensor, wherein the first member is fixed to the moveable casing so as to position the line sensor.

7. An image reader according to claim 6, further comprising a second member fixed to the movable casing, wherein the first and second members are fixed to each other to facilitate positioning the line sensor.

8. An image reader according to claim 1, wherein the base includes a protrusion, and wherein the pushing member pushes the support structure into pressure contact with the protrusion.

9. An image reader according to claim 1, wherein the adjusting member includes a set screw engaged with the support structure and the base such that adjusting the set screw moves the support structure relative to the base to change the spacing.

10. An image render according to claim 1, further comprising a reflecting mirror refracting the light reflecting off the document onto the plurality of imaging mirrors.

11. An image reader according to claim 10, further comprising a movable casing supporting the illuminator, the line sensor, the reflecting mirror, and the plurality of imaging mirrors.

12. An image reader for reading a document, the image reader comprising:
- a light source emitting light onto the document;
- a line sensor;
- a plurality of imaging mirrors, including an adjustable imaging mirror, each having an off-axial reflecting surface to refract light reflecting off the document onto the line sensor;
- a mirror adjusting mechanism operatively coupled to the adjustable imaging mirror to adjust an orientation of the adjustable imaging mirror, the mirror adjusting mechanism comprising:
- a support structure supporting the imaging mirror;
- a base;
- an adjusting member positioned in contact between the base and the support structure to define a spacing between the base and the support structure so that the support structure has a position relative to the base;
- a pushing member pushing the support structure into pressure contact with the adjusting member;
- wherein adjusting the adjusting member changes the spacing between the support structure and the base so as to change the position of the support structure, and therefore change the orientation of the adjustable imaging mirror; and
- a moveable easing supporting the light source, the line sensor, and the plurality of imaging mirrors.

* * * * *